United States Patent [19]

Grabow et al.

[11] Patent Number: 5,564,069
[45] Date of Patent: Oct. 8, 1996

[54] COMMUNICATION FOR A DATA TRANSMISSION FOR A MOVING VEHICLE TO A STATIONARY BEACON

[75] Inventors: Wilhelm Grabow, Nordstemmen; Friedrich-Wilhelm Bode, Apelern, both of Germany

[73] Assignee: Robert Bosch GmbH, Stuttgart, Germany

[21] Appl. No.: 394,552

[22] Filed: Feb. 27, 1995

Related U.S. Application Data

[63] Continuation of Ser. No. 54,686, Apr. 28, 1993, abandoned.

[30] Foreign Application Priority Data

Apr. 28, 1992 [DE] Germany .......................... 42 13 879.5

[51] Int. Cl.⁶ .............................. H04B 1/59; H04B 1/68
[52] U.S. Cl. ........................ 455/47; 455/54.1; 455/106; 342/51
[58] Field of Search ................................. 342/361, 363, 342/365, 188, 51, 44; 455/106, 95, 99, 47, 59, 60, 107, 104, 109, 111, 54.1, 61, 88, 101, 102, 103, 132, 272; 340/825.54; 333/139, 164, 156; 343/861, 860; 332/170, 171, 103

[56] References Cited

U.S. PATENT DOCUMENTS

| | | | |
|---|---|---|---|
| 2,549,423 | 4/1951 | Carlson | 455/59 |
| 3,375,516 | 3/1968 | Hart et al. | |
| 3,668,526 | 6/1972 | Raskin | |
| 3,958,244 | 5/1976 | Lee et al. | |
| 4,081,748 | 3/1978 | Batz | |
| 4,193,035 | 3/1980 | Berger | |

(List continued on next page.)

FOREIGN PATENT DOCUMENTS

| | | |
|---|---|---|
| 0113571 | 7/1984 | European Pat. Off. |
| 0218843 | 4/1987 | European Pat. Off. |
| 0263332 | 4/1988 | European Pat. Off. |
| 0309855 | 4/1989 | European Pat. Off. |
| 0317181 | 5/1989 | European Pat. Off. |

(List continued on next page.)

OTHER PUBLICATIONS

Lother Tschimpke, "Mobile UKW–Empfang in bebautam Gebiet und Empfangsverbesserung durch Diversity", (Mobile FM reception in built-up areas and reception improvement using diversity), in 579 *Rundfunktechnische Mitteilungen*, vol. 25, No. 1, pp. 16–20 (1981) (Broadcast Technology News).

"A Communication Architecture for Real–Time Applications in short Range Mobile Radio Networks", Kremer et al, 41st IEEE Vehicular Technology Conference, May 1991, St. Louis, MO (pp. 793–797).

G. Freij, D. De Preter, R. Schuessler, "Technological Options for Vehicle–Beacon Communication" Sep. 1990, pp. 11–19.

*Primary Examiner*—Reinhard J. Eisenzopf
*Assistant Examiner*—Nguyen Vo
*Attorney, Agent, or Firm*—Frishauf, Holtz, Goodman, Langer & Chick, P.C.

[57] ABSTRACT

In a communication system for data transmission from a moving vehicle to a stationary beacon (1) which has a transceiver in which a signal is broadcast by the beacon (1) and received by an antenna (5, 5') of an on-board unit (4) of the vehicle and after a modulation with a data signal is transmitted back again to the beacon (1), where the data are extracted from the returned signal, the reliability of transmission for the data is increased by providing that the on-board unit (4) has at least two modulators (6, 6'), with which independently of one another the received signal is modulatable with the data signal and can be transmitted back in different ways. The transmission in different ways of the signals modulated independently of one another can be done by means of spatial separation of the antennas (5, 5') and/or by means of polarizing the broadcast signals differently from one another.

12 Claims, 3 Drawing Sheets

U.S. PATENT DOCUMENTS

| | | |
|---|---|---|
| 4,357,593 | 11/1982 | von Tomkewitsch ..................... 340/23 |
| 4,490,830 | 12/1984 | Kai et al. ................................. 455/59 |
| 4,513,412 | 4/1985 | Cox . |
| 4,521,878 | 6/1985 | Toyonaga ................................. 455/60 |
| 4,528,697 | 7/1985 | Nichols . |
| 4,584,692 | 4/1986 | Tazuka et al. ........................... 455/60 |
| 4,628,517 | 12/1986 | Schwarz et al. ......................... 455/59 |
| 4,742,573 | 5/1988 | Popovic ............................ 340/825.54 |
| 4,850,037 | 7/1989 | Bochmann . |
| 4,890,076 | 12/1989 | Higashi et al. ........................ 455/109 |
| 4,962,534 | 10/1990 | Taylor et al. . |
| 4,983,976 | 1/1991 | Ogata et al. ............................. 342/44 |
| 5,036,331 | 7/1991 | Dallabetta et al. . |
| 5,081,458 | 1/1992 | Meunier ............................ 340/825.54 |
| 5,095,535 | 3/1992 | Freeburg . |
| 5,097,484 | 3/1992 | Akaiwa . |
| 5,101,510 | 3/1992 | Duckeck ................................. 455/186 |
| 5,136,264 | 4/1992 | Nardozza . |
| 5,164,719 | 11/1992 | Guena et al. ...................... 340/825.54 |
| 5,201,071 | 4/1993 | Webb . |
| 5,203,018 | 4/1993 | Hirose . |
| 5,319,802 | 6/1994 | Carniade . |
| 5,355,521 | 10/1994 | Henoch et al. ........................... 455/59 |

FOREIGN PATENT DOCUMENTS

| | | |
|---|---|---|
| 0368545 | 5/1990 | European Pat. Off. . |
| 0464014 | 1/1991 | European Pat. Off. . |
| 0444416 | 9/1991 | European Pat. Off. . |
| 0457460 | 11/1991 | European Pat. Off. . |
| 0459440 | 12/1991 | European Pat. Off. . |
| 2743370 | 8/1982 | Germany . |
| 3301512 | 2/1984 | Germany . |
| 3248544 | 7/1984 | Germany . |
| 3423289 | 1/1986 | Germany . |
| 3905493 | 8/1990 | Germany . |
| 4021636A1 | 1/1991 | Germany . |
| 0233620 | 9/1988 | Japan . |
| 4-140934 | 5/1992 | Japan . |
| 2221820 | 2/1990 | United Kingdom . |
| WO-A-8303505 | 10/1983 | WIPO . |
| WO9004866 | 5/1990 | WIPO . | ously, the received signal is modu-
COMMUNICATION FOR A DATA TRANSMISSION FOR A MOVING VEHICLE TO A STATIONARY BEACON This application is a Continuation of application Ser. No. 08/054,686, filed Apr. 28, 1993, now abandoned. Cross-reference to related patents and applications, assigned to a subsidiary of the present assignee, the disclosures of which are hereby incorporated by reference: U.S. Pat. No. 5,195,109, BOCHMANN et al., issued MAR. 16, 1993; U.S. Pat. No. 4,939,791, BOCHMANN, issued JUL. 3, 1990; U.S. Ser. No. 07/908,185, WIEDEMANN, filed JUL. 1, 1992; U.S. Ser. No. 07/910,643, BOCHMANN, filed JUL. 8, 1992; U.S. Ser. No. 07/935,848, WIEDEMANN et al., filed AUG. 26, 1992. Cross reference to related applications, assigned to the assignee of the present application: DE-OS 40 39 887 (pub. JUNE '92) and corresponding PCT/DE 91/00926, filed NOV. 27, 1991, of which the U.S. national phase is U.S. Ser. No. 08/039,366 SIEGLE et al., filed APR. 27, 1993 German applications of APR. 28, 1992: P 42 13 880, P 42 13 881 and P 42 13 882, and corresponding U.S. applications filed APR. 28, 1993: 08/054,687; 08/054,685; and 08/054,688.

FIELD OF THE INVENTION

The invention relates to a communication system for data transmission from a moving vehicle to a stationary beacon, which has a transceiver unit, in which a signal is broadcast by the beacon and received by an antenna of an on-board unit of the vehicle and is transmitted back to the beacon again after modulation with a data signal, and at the beacon the data are extracted from the returned signal.

BACKGROUND

Particularly for traffic control technology, a system is provided in which data transmission is done from a vehicle moving past a stationary beacon to that beacon. Since it is impractical to equip the vehicles themselves with a transmitter, provision is made for having carrier signals transmitted continuously from the beacon; these signals are then received by the vehicle moving past and are modulated with a data signal. The carrier frequencies in question are in the microwave range (such as 5.8 GigaHertz). The carrier signal is received by the antenna of the vehicle moving past and is modulated with a data signal furnished in the vehicle.

It is known for the modulation to be done at the base of the antenna at different frequencies for the two logical states of the data signal, and for the carrier signal to be reflected in modulated form from the antenna, so that the vehicle need not furnish transmission power of its own. The modulation methods used are typically frequency-encoding, by which the carrier frequency is shifted by a different frequency as a function of logical "1" than as a function of logical "0" (this is known as frequency shift keying).

While the stationary beacons can be set up as base installations at the necessary expense, there must be an effort to make the on-board units of the vehicles as inexpensive as possible. This is also true for the antennas that are used in combination with the on-board unit. A hindrance to this is the fact that data transmission in the system described in subject to considerable interference, which is due to other vehicles, interference from the vehicle engine and ignition system, and so forth.

SUMMARY OF THE INVENTION

The problem underlying the invention is accordingly that on the one hand the attempt is made to achieve on-board units that are as economical as possible, yet on the other hand the highest possible reliability of transmission for the data must be assured, so that the object of the system, namely to furnish traffic control information, can be attained.

In view of this object, the communication system of the type described at the outset is characterized in that the on-board unit has at least two modulators, with which, independently of one another, the received signal is modulatable with the data signal and can be transmitted back in different ways.

In the communication system according to the invention, the reliability of data transmission for transmission from the on-board unit to the beacon is increased by providing that two modulations take place independently of one another, and that the modulated signals are transmitted back from the vehicle to the beacon in different ways. The differing return transmission of the modulated signals can be done with the aid of two spatially separated antennas, each of which is connected to a modulator. By the return transmission of the received signals with spatial separation from one another, some of the local interference factors can be eliminated.

In an alternative or additional option, the antennas connected to the modulators are designed for polarized broadcasting of the modulated signals with different polarizations. The differing return transmission of the received signals can thus be achieved solely by means of different polarizations of the returned signals, or by means of a combination of the different antenna locations with different polarizations. The returned signals are suitably orthogonally polarized with respect to one another in the case of linear polarization or are polarized with opposed rotation in the case of circular polarization. Circular polarizations will preferably be used, because they are not vulnerable to certain echo factors (from reflection), By including the polarization of the transmitted signals, numerous combination options exist, even though the beacon broadcasts polarized electromagnetic waves for different polarizations, which are preferably supplied by signals at different frequencies. These signals may be transmitted back in modulated form with appropriate polarization by two antennas of the on-board unit.

In all cases, it is suitable for the on-board unit to be designed for modulated reflection of the signals received by the beacon, or in other words if it requires no transmission power of its own. Such a modulation can be done in a manner known per se, by varying the base reactants of the antenna with a modulation frequency; the modulation frequency for logical "1" is different from the modulation frequency for logical "0".

An increase in the transmission reliability is assured by forming the modulators as phase modulators, at each of which the received signal and the data signal are present. The phase in each case is varied with the modulated data signal, and the speed of phase variation is different for logical "1" and logical "0".

In all cases, the modulators are preferably single-sideband modulators. In that case, the differently modulated signals can be generated as (different) sidebands to the same carrier frequency.

If a plurality of beacons are located in the receiving range of a vehicle, then it is appropriate to have them transmit at different frequencies; the vehicle can transmit data back to both beacons in two different ways with two antennas, in which case each antenna then requires two single-sideband modulators.

A simple version of a single-sideband modulator comprises a series circuit of one lambda/8 and one lambda/4 delay circuit at the base of the associated antenna; a first diode parallel to the lambda/8 delay circuit and a second diode parallel to the lambda/4 delay circuit are connected in series with the first diode, and both diodes can be switched into the conducting and blocking state, each with one modulation signal. According to the invention, at least two such single-sideband modulators are present in the on-board unit.

In a further feature of the invention, other encoded signals, such as pulse code modulation, may be used instead of the frequency modulation referred to above.

DRAWING

The invention is described in detail below in terms of an exemplary embodiment shown in the drawings.

DETAILED DESCRIPTION

Figure 1:
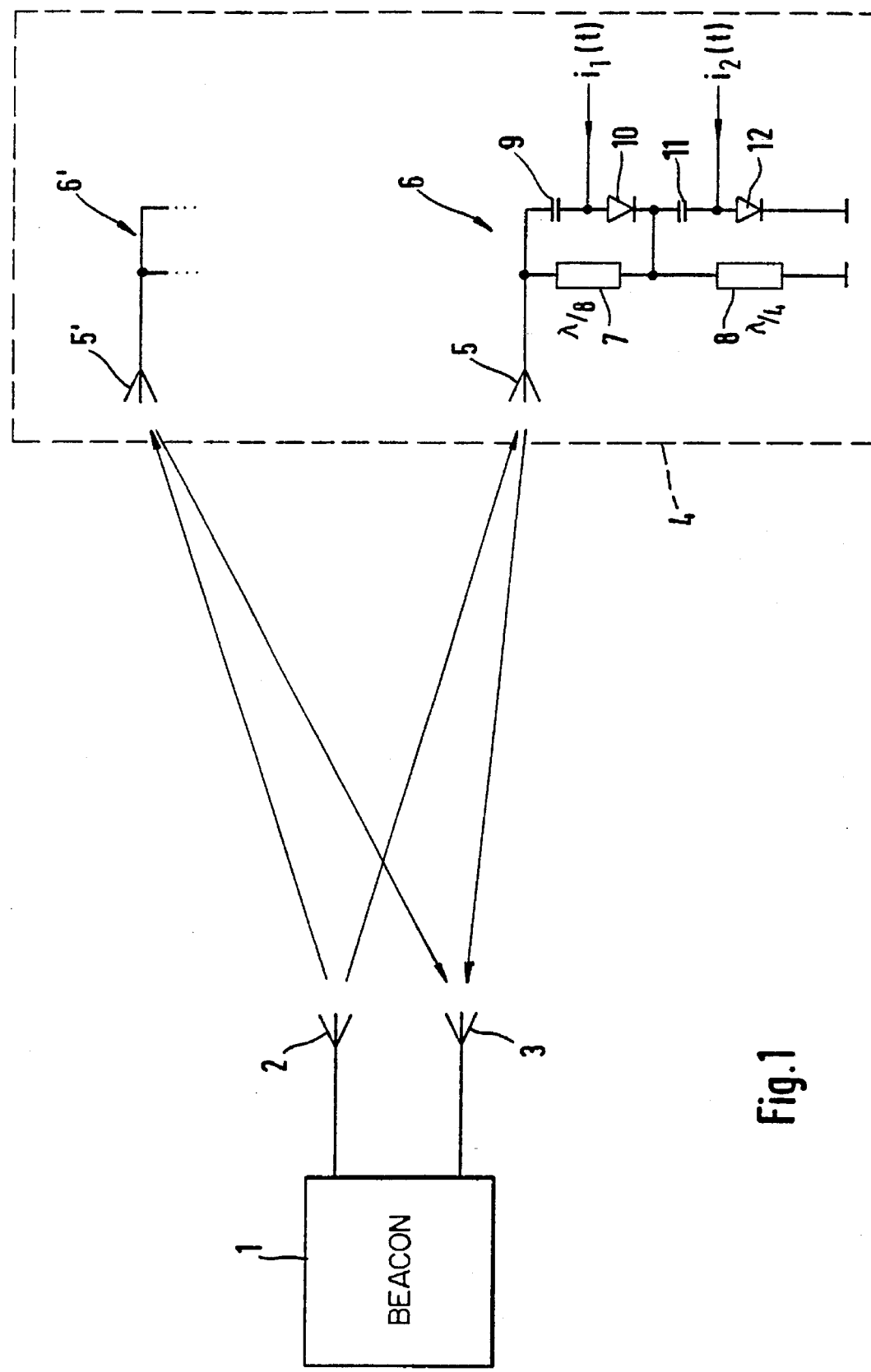
FIG. 1 is a schematic diagram of a communication system, comprising a beacon and a vehicle with two antennas, to which antennas a phase-shifting single-sideband modulator is connected.

FIG. 1 shows a stationary beacon 1 with a transmitting antenna 2 and a receiving antenna 3. The transmitting antenna broadcasts a continuous signal at a fixed frequency. This signal is received by the on-board unit 4 of a vehicle having two antennas 5, 5' which are located at different places on the vehicle. One single-sideband modulator 6, 6' is connected to each of the antennas. In the exemplary embodiment shown, the single-sideband modulator 6 comprises a series circuit, connected to ground at the base of the antenna 5, of a lambda/8 delay line 7 and a lambda/4 delay line 8. The lambda/8 delay line 7 is bridged by the series circuit of a block capacitor 9 with a diode 10 connected in the flow direction, while the lambda/4 delay circuit 8 can be bridged by a corresponding series circuit of a block capacitor 11 and a diode 12 connected in the flow direction. Accordingly, the connecting points between the delay circuits 7, 8 on the one hand and between the diode 10 and the block capacitor 11 on the other are connected to one another.

Modulation signals $i_1(t)$ and $i_2(t)$ are each coupled in between the block capacitor 9 and diode 10 and the block capacitor 11 and diode 12, respectively.

Figure 2:
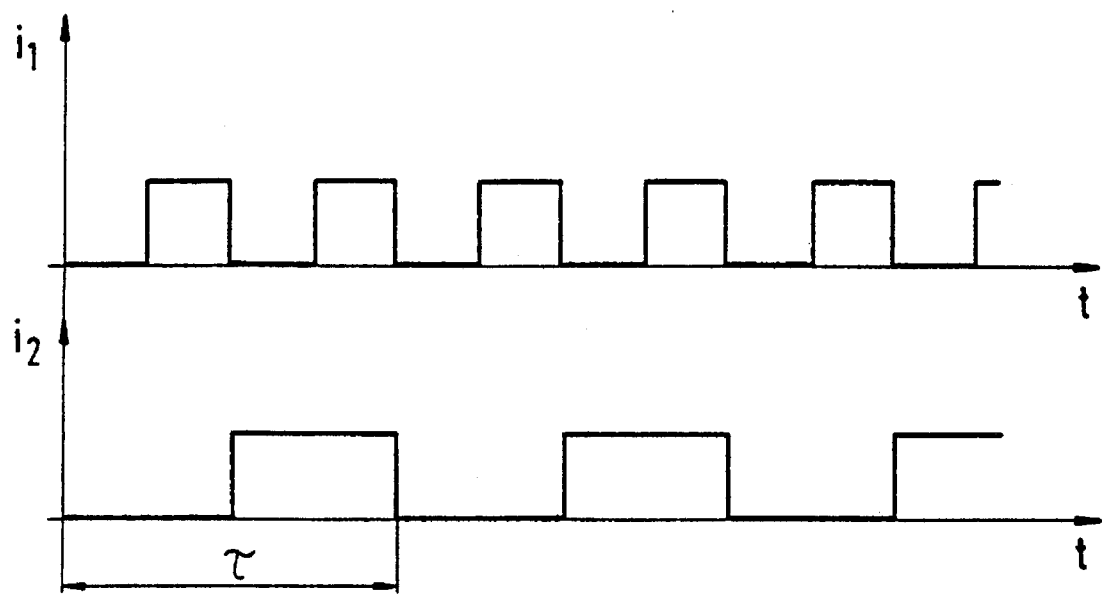
FIG. 2 is a pulse diagram for the clock signals $i_1(t)$ and $i_2(t)$ triggering the phase modulator of FIG. 1.

In the exemplary embodiment shown, the modulation signals $i_1(t)$ and $i_2(t)$ have the function of performing a data-dependent modulation, on the one hand, and on the other of assuring phase modulation. To that end, the modulation signals $i_1(t)$ and $i_2(t)$ have the pulse courses shown in FIG. 2; the pulse and the pulse gap each have the same width, and the width for the signal $i_1(t1)$ is half that of the signal $i_2(t)$. For a period tau, four different constellations result, as indicated in FIG. 2. In the first constellation, both signals are "low". As a result, neither diode is conducting, so that the two delay circuits 7, 8 become operative in succession, resulting in a phase shift by 3/8 lambda. This situation is marked 1 in the phase diagram of FIG. 3.

In constellation 2, the signal $i_1(t)$ causes the upper diode 10 to be made conducting, so that lambda/8 delay circuit 7 is bridged. Accordingly only the lambda/4 delay circuit 8 is operative, leading to a phase shift by lambda/4. This situation is marked 2 in FIG. 3.

In constellation 3 of FIG. 2, the diode 10 is not conducting because of the "low" state of the signal $i_1(t)$, while contrarily the lower diode 12 is conducting. The result is a lambda/8 phase shift, which is marked 3 in FIG. 3.

Figure 3:
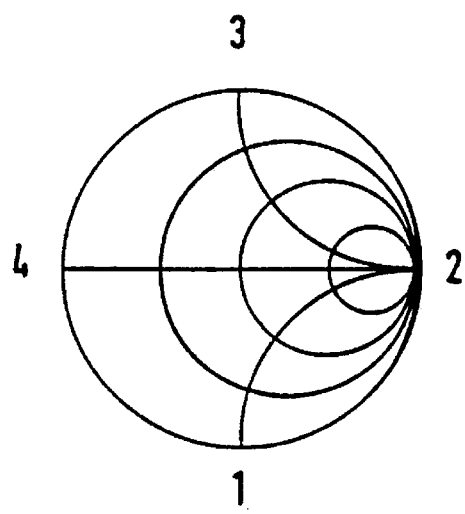
FIG. 3 is a phase diagram for the phase positions resulting from the pulse diagram of FIG. 2.

In state 4, both diodes 10, 12 are made conducting, so that the short-circuit case exists with a phase shift of zero. This is marked 4 in FIG. 3. As a result, during a period tau, the phase shifts are run through sequentially from 0 through 3/8 lambda, 2/8 lambda, 1/8 lambda and 0 again; that is, the outer orbit in the phase diagram of FIG. 3 is taken once.

For the state of logical "0" the period is now selected to be longer than for the state of logical "1". The result for the state of logical "1" is a higher frequency, with which the signal arriving from the beacon at the antenna 5 is modulated.

Figure 4:
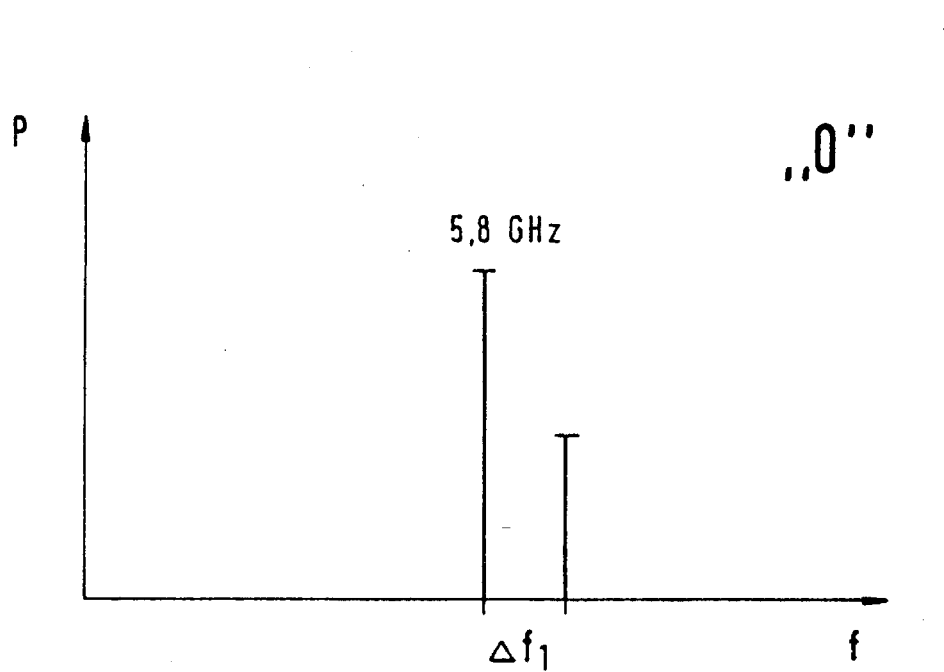
FIG. 4 is a frequency diagram for showing the logical states "0" and "1".
Figure 4:
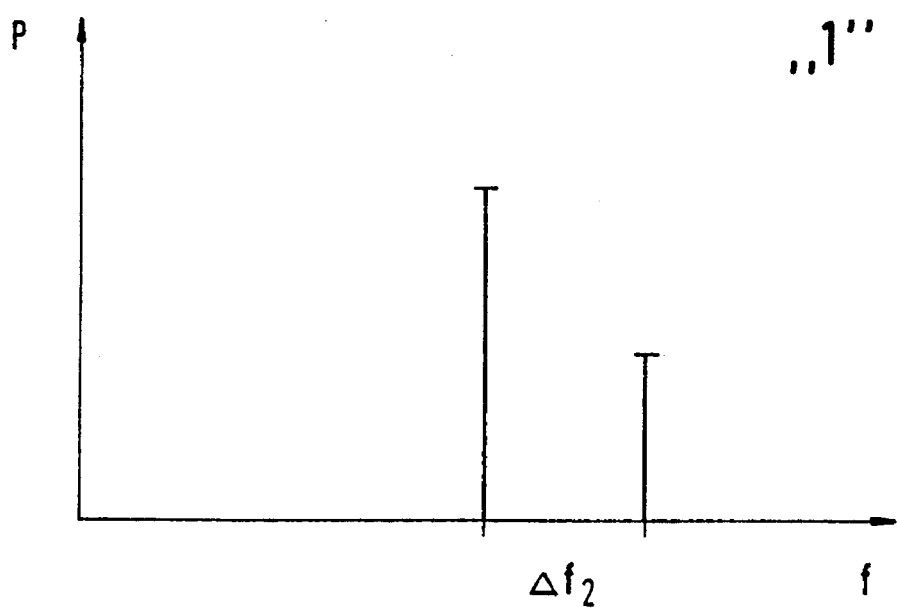

FIG. 4 shows that aside from the phase modulation, the signal "0" is characterized by a position of the sideband different from that of the state "1".

The reflection of the waves from the antennas 5, 5' in polarized form, preferably in circularly polarized form, that is possible according to the invention is due to the use of suitable antennas 5, 5'. Antenna forms suitable for accomplishing this are well known and require no detailed description here.

Various changes and modifications may be made, and features described in connection with any one of the embodiments may be used with any of the others, within the scope of the inventive concept.

What is claimed is:

1. An on-board unit of a communication system for data transmission from a moving vehicle to a stationary beacon, which system has a transceiver, in which a signal is broadcast from only the beacon and received by an antenna of the on-board unit of the vehicle and, after modulation with a data signal, is transmitted back again to the beacon (1), where the data are extracted from the returned signal, wherein the on-board unit (4) comprises:

a plurality of different antennas (5, 5') spatially separated from each other to receive a single frequency signal broadcast from the beacon, and a corresponding plurality of modulators (6, 6'), which, independently and differently of one another, modulate with the data signal the single frequency signal broadcast by the beacon and received by said antennas to output respectively differently modulated signals that are transmitted back to said beacon by said different antennas in different ways.

2. The on-board unit of claim 1, wherein two of said plurality of spatially separated antennas (5, 5') respectively connected to the modulators (6, 6') radiate said signals that are transmitted back to said beacon of respectively different polarizations, wherein said transmitted back signals are polarized in one of (i) a linear polarization and (ii) a circular polarization, such that said transmitted back signals are suitably orthogonally polarized signals with respect to one another in case of the linear polarization and polarized with opposed rotation in the case of the circular polarization.

3. The onboard unit of claim 1, wherein said antennas send back signals with respective different polarizations.

4. The onboard unit of claim 3, wherein said respective different polarizations are one of orthogonal polarization and circular polarization.

5. The on board unit of claim 1, wherein
the beacon has two broadcasting antennas for signals having different polarizations, which antennas are supplied with a signal at said single frequency and a signal at another frequency, respectively.

6. The on-board unit of claim 1, wherein
the on-board unit (4) is designed for a modulated reflection of the signals received by the beacon (1).

7. The on-board unit of claim 1, wherein
the modulators (6, 6') are formed as phase modulators, at each of which the received signal and the data signal ($i_1(t)$, $i_2(t)$) is present.

8. The on-board unit of claim 1, wherein
the modulators are single-sideband modulators (6, 6').

9. The on-board unit of claim 8, wherein
as the single-sideband modulator (6), a series circuit of one lambda/8 and one lambda/4 delay circuit (7, 8) is connected to the base of the associated antenna (5), and
a first diode (10) parallel to the lambda/8 delay circuit (7) and a second diode (12) parallel to the lambda/4 delay circuit (8) are connected in series with the first diode (10), and both diodes (10, 12) switch among a conducting state and a blocking state, responsive to a respective modulation signal ($i_1(t)$, $i_2(t)$).

10. The onboard unit of claim 1, wherein said plurality of antennas comprises two spatially separated antennas (5, 5'), each of which is connected to one modulator (6, 6').

11. The onboard unit of claim 10, wherein said antennas transmit said respectively different modulated signals with different polarizations.

12. The onboard unit of claim 11, wherein said polarizations are orthogonal polarization or circular polarization.

* * * * *

UNITED STATES PATENT AND TRADEMARK OFFICE
CERTIFICATE OF CORRECTION

PATENT NO. : 5,564,069
DATED : Oct. 8, 1996
INVENTOR(S) : Wilhelm GRABOW et al.

It is certified that error appears in the above-indentified patent and that said Letters Patent is hereby corrected as shown below:

Title Page, Item [56] References Cited under OTHER PUBLICATIONS insert:

--Bragas & Deuper, "Von ALI zum IVB," Bosch Technische Berichte, vol. 8, No. 1, pages 26-31, Robert Bosch GmbH, Stuttgart 1986.

Automotive Electronics Journal, JAN. 29, 1990, page 19.

Von Tomkewitsch, "Dynamic Route Guidance..." IEEE Transactions on Vehicular Technology, Vol. 40, No. 1, FEB. 1991, pages 45-50.

Christopher O'Malley, "Electronics as your Co-pilot," Popular Science, Sept. 1991, pages 66-69.

UNITED STATES PATENT AND TRADEMARK OFFICE
CERTIFICATE OF CORRECTION

PATENT NO. : 5,564,069
DATED      : Oct. 8, 1996
INVENTOR(S): Wilhelm GRABOW et al.

It is certified that error appears in the above-indentified patent and that said Letters Patent is hereby corrected as shown below:

Zinke & Brunswig, <u>LEHRBUCH DER HOCHFREQUENZTECHNIK</u>, 2nd Ed., Vol. 2, Springer-Verlag, Berlin-Heidelberg-New York, pp. 301-320.

P.T. BLYTHE, "Advanced Telematics in Road Transport," Proceedings of the DRIVE Conference, Brussels, Belgium 1991
Vol. 1, pages 248-269; Elsevier for Commission of the Eur. Comm.

European Radiocommunications Committee, Report 3, Lisbon, Feb. '91.--

Signed and Sealed this

Twenty-fifth Day of March, 1997

*Attest:*

BRUCE LEHMAN

*Attesting Officer*     *Commissioner of Patents and Trademarks*